United States Patent [19]
Maggioni

[11] Patent Number: 5,277,300
[45] Date of Patent: Jan. 11, 1994

[54] MULTIPLE-CHANNEL VIBRATING TABLE FOR FEEDING LOOSE PARTS

[75] Inventor: Roberto Maggioni, Gorgonzola, Italy

[73] Assignee: Promart S.r.l., Segrate, Italy

[21] Appl. No.: 965,327

[22] Filed: Oct. 23, 1992

[30] Foreign Application Priority Data

Oct. 30, 1991 [IT] Italy .................. MI91A002883

[51] Int. Cl.⁵ .............................................. B65G 27/16
[52] U.S. Cl. .................................... 198/759; 198/752; 198/771
[58] Field of Search ............... 198/396, 443, 752, 758, 198/759, 771, 550.3, 537

[56] References Cited

U.S. PATENT DOCUMENTS

| | | | |
|---|---|---|---|
| 3,224,553 | 12/1965 | Campbell | 198/771 X |
| 4,037,710 | 7/1977 | Brutcher | 198/771 X |
| 4,146,123 | 3/1979 | Cottrell | 198/758 X |

FOREIGN PATENT DOCUMENTS

| | | | |
|---|---|---|---|
| 2740577 | 3/1979 | Fed. Rep. of Germany | 198/771 |
| 0012220 | 2/1981 | Japan | 198/752 |
| 0125512 | 7/1983 | Japan | 198/752 |

*Primary Examiner*—James R. Bidwell
*Attorney, Agent, or Firm*—Guido Modiano; Albert Josif

[57] ABSTRACT

A multiple-channel vibrating table for feeding loose parts, including a table which is constituted by a plurality of feeder troughs which are arranged mutually side by side, define the channels for conveying loose parts and are vibrated in order to cause the advancement of the parts along the troughs themselves. The vibrating table further comprises at least one return trough arranged to the side of one of the feeder troughs in order to receive the parts which exit laterally from the feeder trough. The return trough can be activated with a vibrating motion which exerts, on the parts present in the return trough, an advancement action in the direction opposite to the advancement action exerted on the parts in the feeder trough.

13 Claims, 3 Drawing Sheets

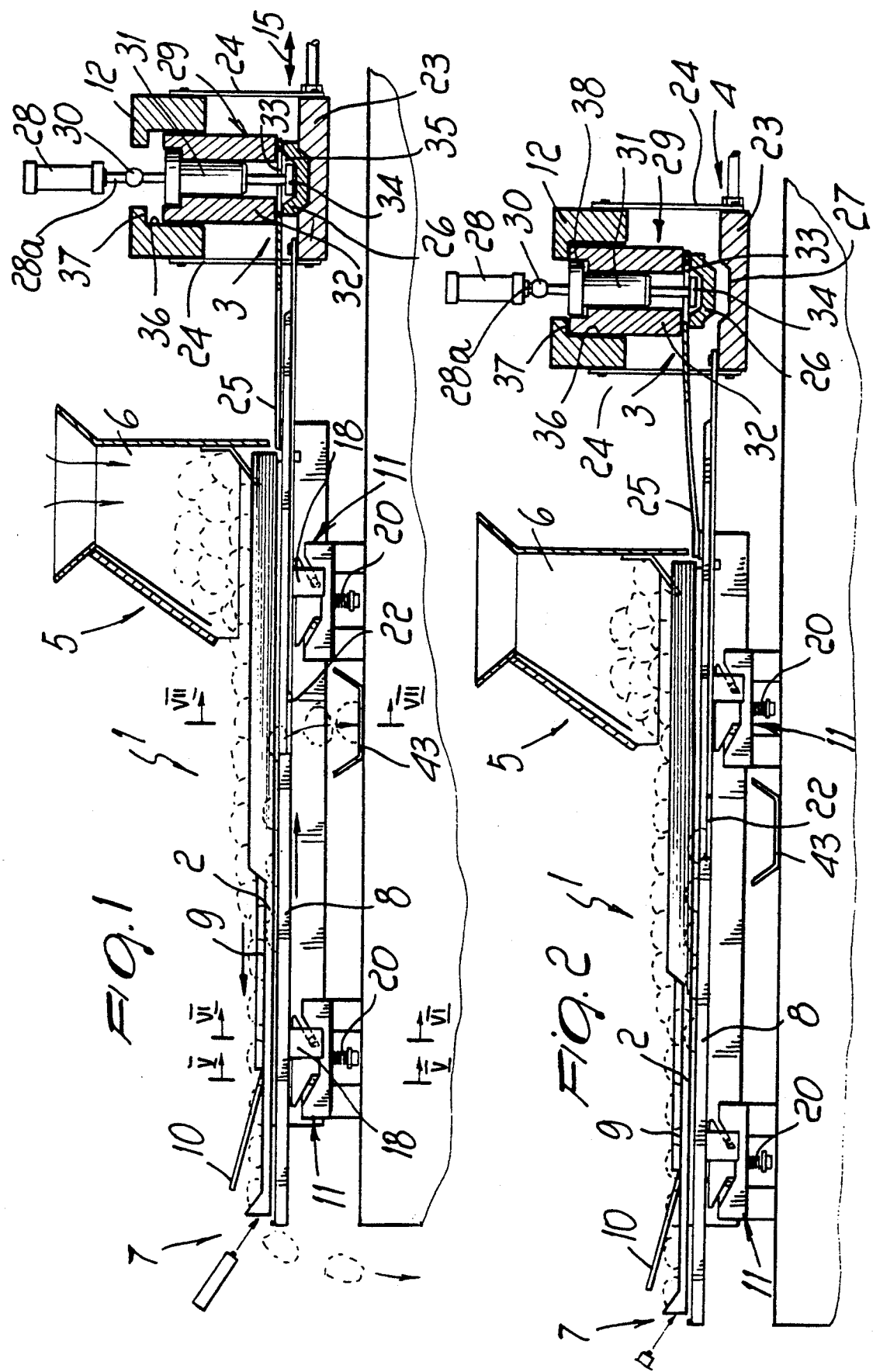

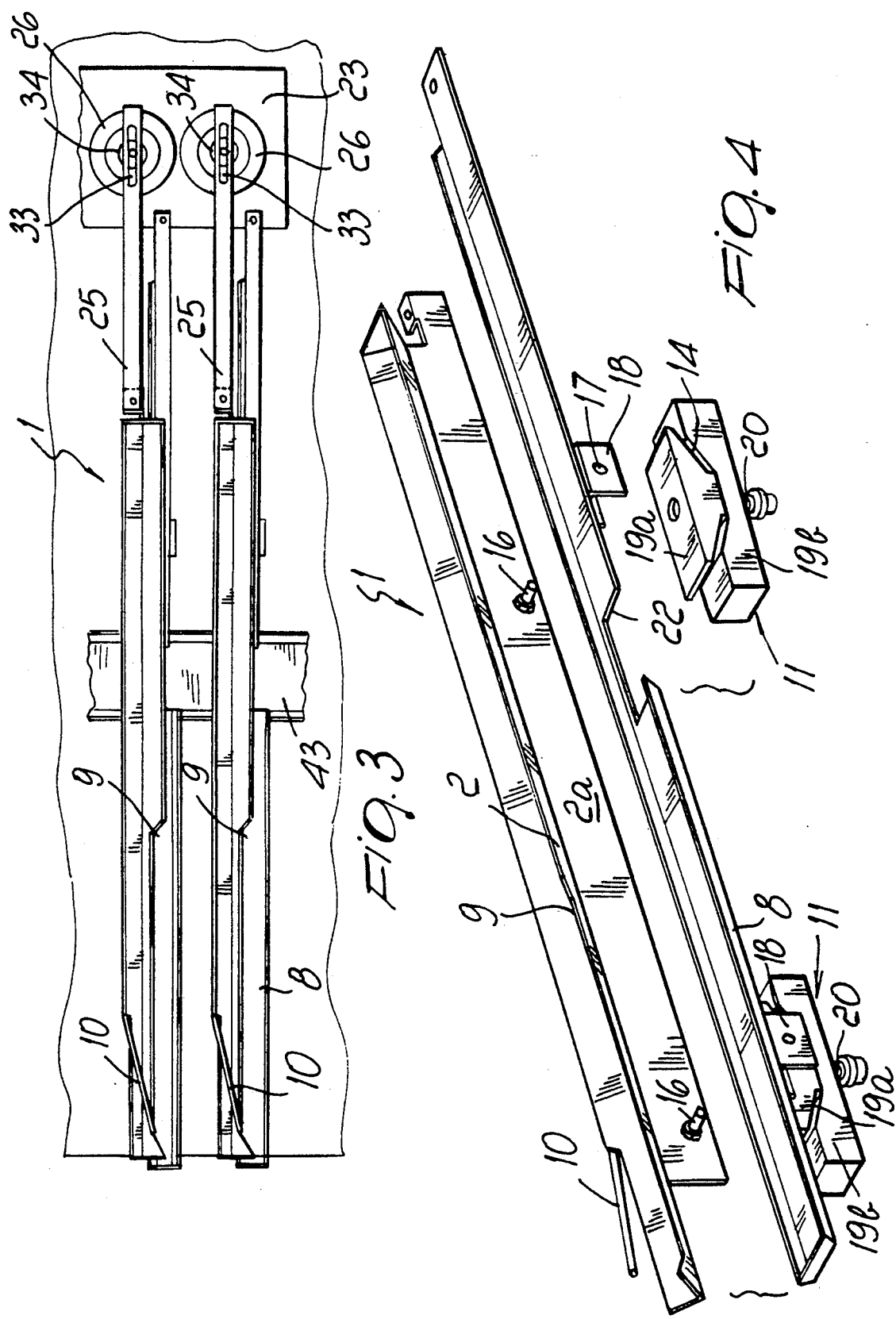

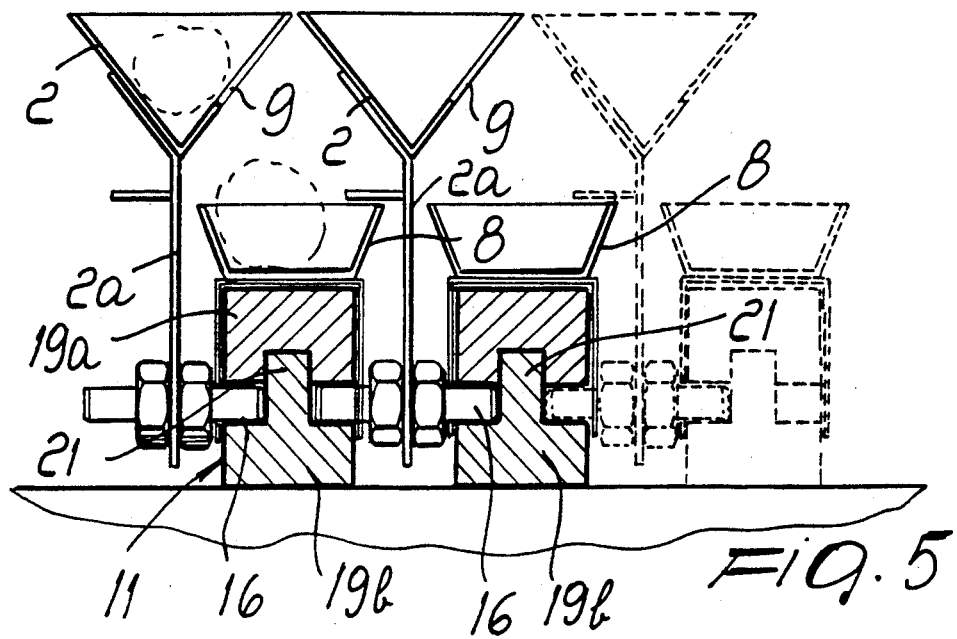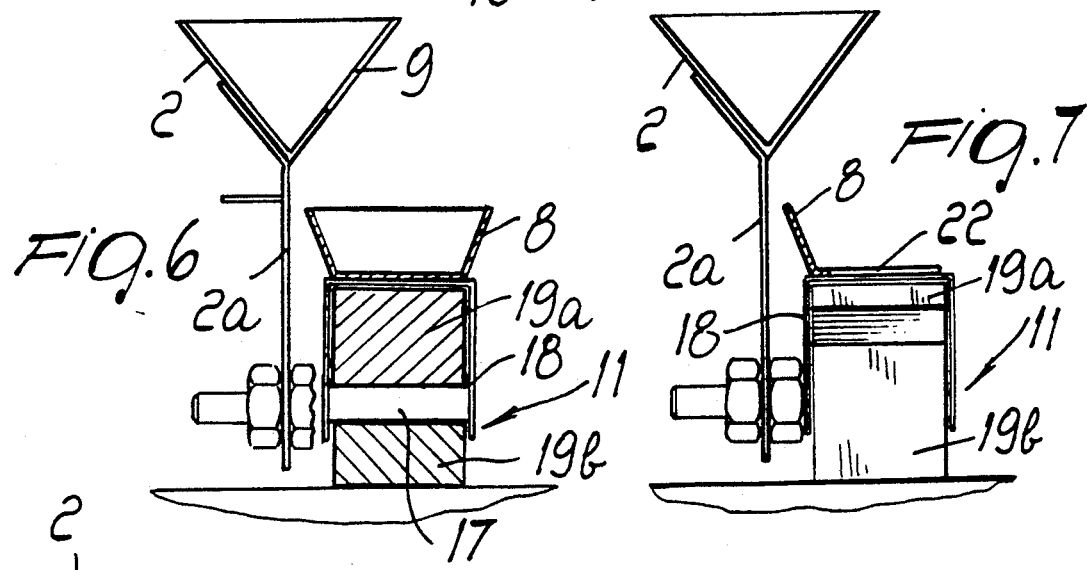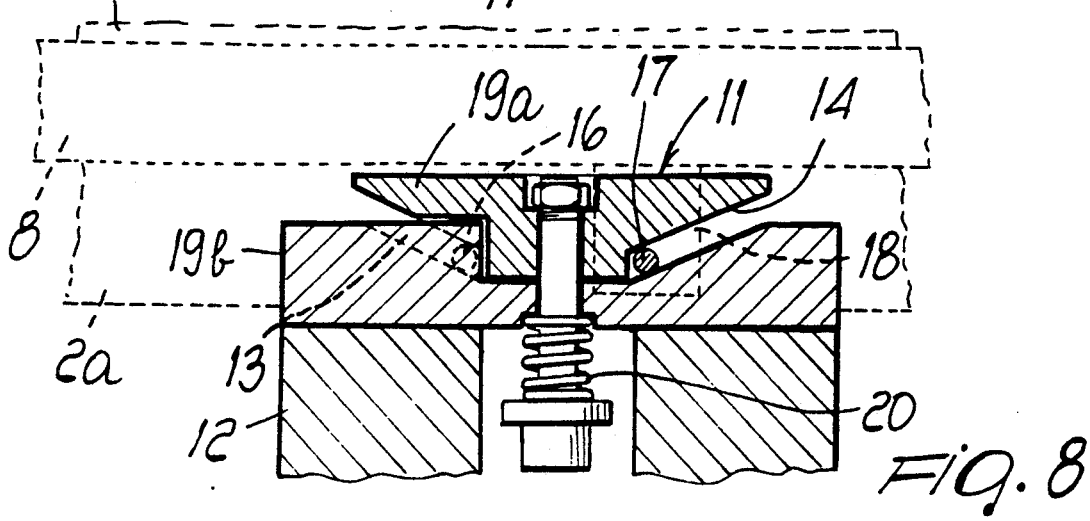

MULTIPLE-CHANNEL VIBRATING TABLE FOR FEEDING LOOSE PARTS

BACKGROUND OF THE INVENTION

This invention relates to a multiple-channel vibrating table for feeding loose parts in general.

Vibrating tables for feeding loose parts of any kind or sort are known and are substantially constituted by a plurality of troughs arranged side by side which are subjected, by means of various kinds of systems, to a vibration which has a longitudinal component so as to cause the progressive advancement of the parts along the troughs.

The shape of the troughs and their number vary in each instance according to the type of the parts to be fed and according to the requirements of production.

Generally, multiple-channel vibrating tables are used when it is necessary to feed the parts to a machine in a counted, aligned, orientated, sorted or otherwise controlled 5 manner. In practice, vibrating tables provide a controlled feeding of a machine or of a production line according to the requirements of production.

However, the currently commercially available types of multiple-channel vibrating table are unable to fully meet the requirements of machines or lines which require high precision in part feeding. In fact, with known multiple-channel vibrating tables excesses or non-uniformities in the supply of the parts to the final part of the vibrating table can occur, and these excesses or non-uniformities are very often passed on to the line which is fed by the vibrating table, since known vibrating tables, although they even out the position and sequence of advancement of the parts, are unable to eliminate excess parts in a manner which complies with the necessary production rates.

Indeed, when it is necessary to have a feeding system which can eliminate excess parts, other types of feeder or part movement devices are used which have a circular or spiral shape and recover the excess parts which are not fed to the machine or line arranged downstream by recycling them into the inner part of the feeder.

These types of feeder or movement devices, however, are more bulky and complicated than multiple-channel vibrating tables, and very often they cannot be adapted easily to the production line to be fed.

SUMMARY OF THE INVENTION

The aim of the invention is to provide a multiple-channel vibrating table which is able to ensure high precision in feeding loose parts even in the presence of non-uniformities in the feeding of said parts to the vibrating table.

Within the scope of this aim, an object of the invention is to provide a vibrating table which has excellent precision in feeding even at high work rates.

Another object of the invention is to provide a vibrating table which allows automated recovery of the excess parts.

A further object of the invention is to provide a vibrating table which is simple to manufacture and has competitive production costs.

This aim, these objects and others which will become apparent hereinafter are achieved by a multiple-channel vibrating table for feeding loose parts in general, which comprises a table constituted by a plurality of feeder troughs arranged side by side and defining channels for conveying loose parts, motor means being provided in order to vibrate said table, characterized in that it comprises at least one return trough arranged to the side of one of said feeder troughs in order to receive parts which exit laterally from said feeder trough, said return trough being activatable with a vibrating motion which exerts, on parts in said return trough, an advancement action in the direction opposite to the advancement action exerted on parts in said feeder trough.

BRIEF DESCRIPTION OF THE DRAWINGS

Further characteristics and advantages will become apparent from the description of a preferred but not exclusive embodiment of a multiple-channel vibrating table according to the invention, illustrated only by way of non-limitative example in the accompanying drawings, wherein:

FIG. 1 is a schematic partially sectional lateral elevation view of the vibrating table according to the invention;

FIG. 2 is a view, taken similarly to FIG. 1, with a feeder trough deactivated;

FIG. 3 is a schematic plan view of a portion of the vibrating table according to the invention;

FIG. 4 is an exploded perspective view of a feeder trough and of a return trough;

FIG. 5 is an enlarged sectional view of FIG. 1, taken along the plane V—V;

FIG. 6 is an enlarged sectional view of FIG. 1, taken along the plane VI—VI;

FIG. 7 is an enlarged sectional view of FIG. 1, taken along the plane VII—VII; and FIG. 8 is an enlarged sectional view of a detail of FIG. 1.

DESCRIPTION OF THE PREFERRED EMBODIMENTS

With reference to the above figures, the multiple-channel vibrating table according to the invention comprises a table, generally designated by the reference numeral which is constituted by a plurality of feeder troughs 2 which are arranged mutually side by side and extend parallel to one another.

In the illustrated embodiment, which is to be considered as non-limitative, each feeder trough 2 has a V-shaped transverse cross-section which is fixed to the upper side of a vertical plate 2a.

The feeder troughs 2 can be connected, by virtue of controllably activatable connection means 3, to motor means 4 which vibrate the troughs 2 so as to cause the advancement of the loose parts along the troughs 2 from an input station 5, constituted for example by a hopper 6, to an output station 7 which can be constituted by the inlet of a packaging machine or of a production line in general, as will be described in greater detail hereinafter.

According to the invention, laterally to at least one of the feeder troughs 2 there is a return trough 8, arranged so as to receive the excess parts which exit from the feeder trough 2 and is connected to motor means activating said return trough 8 with a vibrating motion which makes the parts advance in a direction opposite to the advancement direction imparted to the parts in the feeder trough 2.

Preferably, there is a return trough 8 for each feeder trough 2, and the feeder troughs 2 are provided with a lateral recess portion 9 on the side of the related return trough 8. The size of said recess portion 9 is a function of the feeding requirements and of the dimensions of the loose parts, so as to unload the excess parts fed in the troughs 2 onto the return troughs 8. Furthermore, at said recess portion 9 it is possible to provide leveling means, for example a rod 10, which facilitate the passage of the excess parts from the feeder trough 2 to the return trough 8

In practice, the vibrating table is constituted by feeder troughs 2 alternated with return troughs 8.

The motor means 4 impart to the feeder troughs 2 and to the return troughs 8 a vibration with reciprocating motion along a direction which has a component which is parallel to the longitudinal extension of the troughs, which are mounted respectively on first and second guiding means which define, for the troughs, sliding directions which are inclined with respect to the vibration direction imparted by the motor means so as to obtain the required effect of part advancement.

Said first and second guiding means are constituted by blocks 11 which are applied to the fixed supporting structure 12 of the vibrating table. Each block 11 has, on its lateral faces, which are arranged vertically, two grooves 13 and 14 which are inclined in opposite directions with respect to the vibration direction 15 imparted to the troughs 2 and 8.

The first groove 13 slidably accommodates a pin 16 which is fixed to the vertical plate 2a of the feeder trough, whereas the second groove 14 slidably accommodates a pin 17 fixed to the return trough 8 by means of a bracket-like element 18.

Conveniently, each block 11 is made of two portions 19a and 19b which transversely delimit the two grooves 13 and 14 and are moved close together by the action of a spring 20 which acts on the lower face of the block. The spring 20 thus keeps the transverse walls of the grooves 13 and 14 in contact with the related pins 16 and 17, recovering any play which might arise due to wear.

Furthermore, the groove 13 accommodates two pins 16 of two adjacent feeder troughs 2, and the space for the sliding of the two pins 16 is delimited by an intermediate partition 21.

In practice, the vibrating table is preferably constituted by a plurality of pairs of troughs arranged mutually side by side, Wherein each pair is constituted by a feeder trough 2 and by a return trough 8 which are mounted on two blocks 11 which are mutually spaced along the longitudinal extension of said troughs. The blocks 11 are arranged between these trough pairs so as to simultaneously support the feeder troughs 2 of two pairs of adjacent troughs.

Each return trough 8 has a part discharge passage 22 which is arranged above a recovery channel 43 by means of which the parts arriving from the return trough 8 are collected and/or conveyed back to the hopper 6.

The motor means 4 comprise a mass 23 which is vibrated with a reciprocating motion along the direction 15 by virtue of known means, such as for example a mechanical system with an eccentric element, not illustrated for the sake of simplicity. The direction 15, which is parallel to the longitudinal extension of the troughs 2 and 8, is preferably horizontal.

The vibrating mass 23 is suspended, by means of flexible arms 24, from the fixed supporting structure 12 of the vibrating table, and a longitudinal end of the return troughs 8 is fixed to said vibrating mass.

The feeder troughs 2 can be controllably connected to the vibrating mass 23, preferably in an individual manner, by virtue of the connection means 3 which comprise, for each trough 2, a flexible tab 25 which is fixed to a longitudinal end of the trough 2 and ends with a shaped sliding block 26 which can be coupled to a seat 27 which is shaped complementarily and is defined in the vibrating mass 23.

Actuation means act on each tab 25 and can be controllably activated so as to engage or disengage the sliding block 26 with or from the seat 27 in order to connect or disconnect the related trough 2 to or from the vibrating mass 23.

Said actuation means comprise a fluid-activated cylinder 28 which is supported by the fixed supporting structure 12 and acts with its stem 28a on a presser element 29 with the interposition of an articulation 30 of a known type which does not transmit transverse loads to the stem 28a.

The presser element 29 is constituted by a cylindrical body 31 which passes through another cylindrical body 32 which has a larger diameter and is made of low-friction material for the tab 25 which it faces with its lower end. The lower end of the cylindrical body 31 passes through a longitudinal slot 33 of the tab 25 and ends with an enlarged head 34 which is accommodated in a seat 35 defined in the sliding block 26.

The cylinder 32 can slide vertically in a seat 36 defined in the supporting structure 12 and has an upper shoulder 37 for the cylindrical body 32.

The cylindrical body 31 has a shoulder 38 which is directed downward and faces an abutment of the cylindrical body 32.

In this manner, when the actuation of a feeder trough 2 is required, the cylinder 28 is actuated so that it causes the insertion of the shaped sliding block 26 in the seat 27 of the vibrating mass 23. In this engagement position, the sliding block 26 is pressed in the seat 27 by the cylindrical body 32.

When the actuation of the feeder trough 2 is to be interrupted, the cylinder 28 is actuated in the opposite direction, so that the sliding block disengages from the seat 27 and the tab 25 is pressed, by virtue of the action of the cylindrical body 31, against the lower end of the cylindrical body 32, thus locking the related feeder trough 2.

In practice, the feeder troughs 2 can be actuated independently of one another according to the feeding requirements of the machine or production line arranged downstream of the vibrating table 1.

The operation of the vibrating table according to the invention is as follows.

The reciprocating vibration along the direction 15 of the return troughs 8 and of the feeder troughs 2, which are connected to said vibrating mass 23, produces a reciprocating movement of the troughs along the grooves 13 and 14, in which the pin 16 of the feeder trough 2 slides in the groove 13 while the pin 17 of the return trough 8 slides in the groove 14 and in which the two grooves 13 and 14 are inclined in opposite directions with respect to the vibration direction 15 (FIG. 8); the effect of this movement is the advancement of the parts along the feeder troughs 2 and the advancement, in the opposite direction, of the parts which fall into the return troughs 8.

During advancement along the feeder troughs 2, the excess parts in fact fall into the return troughs 8 without causing alterations with respect to the required amount or arrangement. Furthermore, the parts discharged onto the troughs 8 are collected and can be easily fed back into the hopper 6.

In practice it has been observed that the multiple-channel vibrating table according to the invention fully achieves the intended aim, since the discharge of the excess parts onto the return troughs ensures high precision in feeding at the output of the vibrating table even at high operating rates.

Furthermore, the use of blocks with inclined grooves makes it extremely easy and rapid to assemble the vibrating table and also allows to increase the number of troughs used in a simple and rapid manner and with modest costs.

The multiple-channel vibrating table thus conceived is susceptible to numerous modifications and variations, all of which are within the scope of the inventive concept; all the details may furthermore be replaced with technically equivalent elements.

In practice, the materials employed, as well as the dimensions, may be any according to the requirements and the state of the art.

We claim:

1. Multiple-channel vibrating table for feeding loose parts in general, comprising a table which is constituted by a plurality of feeder troughs which are arranged side by side and define channels for conveying loose parts in general, motor means being provided in order to vibrate said table, wherein said vibrating table comprises at least one return trough arranged to the side of one of said feeder troughs in order to receive parts which exit laterally from said feeder trough, said return trough being actuatable with a vibrating motion which exerts, on the parts in said return trough, an action for advancement in the direction opposite to the advancement action exerted on the parts in said feeder trough, said motor means comprising a mass which vibrates with reciprocating motion along a direction which has a component which is parallel to the longitudinal extension of said troughs, said feeder troughs being mounted on first guiding means which define, for said feeder troughs, an advancement direction which is inclined with respect to the vibration direction of said vibrating mass, said return troughs being connected to said vibrating mass and are mounted on second guiding means which define, for said return troughs, an advancement direction which is inclined with respect to the vibration direction of which is inclined with respect to the vibration direction of said vibrating mass, the inclination of the advancement direction defined by said second guiding means being opposite to the advancement direction defined by said first guiding means.

2. Vibrating table according to claim 1, comprising a return trough arranged to the side of each one of said feeder troughs.

3. Vibrating table according to claim 1, wherein said feeder troughs have, along their longitudinal extension, at least one recess portion on the side of the related return trough in order to discharge excess parts into said return trough.

4. Vibrating table according to claim 3, wherein said feeder troughs have, at said recess portion, part leveling means to convey the excess parts in said return trough.

5. Vibrating table according to claim 1, comprising means for connecting each one of said feeder troughs to said motor means, said connection means individually activatable for the individual actuation of said feeder troughs.

6. Vibrating table according to claim 1, wherein said first and second guiding means comprise at lease one block which is associated with the supporting structure of the vibrating table and is laterally provided with a first groove and with a second groove, said grooves being inclined on opposite sides with respect to the vibration direction of said vibrating mass, said first groove slidably accommodating a pin which is rigidly associated with said feeder trough, said second groove slidably accommodating a in which is rigidly associated with said return trough.

7. Vibrating table according to claim 6, wherein said first and second grooves are delimited by two portions of said block which can move with respect to one another by virtue of the action of, or in contrast with, elastic means upon a change in the transverse width of said grooves.

8. Vibrating table according to claim 7, wherein said block is interposed between two contiguous feeder troughs, said first groove slidably accommodating two pins which are fixed respectively to said two feeder troughs, a partition being provided in said first groove, said partition separating the sliding regions of said two pins.

9. Vibrating table according to claim 6, wherein said vibration direction of the vibrating mass is substantially parallel to the longitudinal extension of said troughs which are arranaged horizontally, and in that the grooves of said block extend in a plane which is substantially vertical and parallel to said troughs.

10. Vibrating table according to claim 6, wherein each one of said troughs is mounted on two blocks which are defined like said block and are mutually spaced along the longitudinal extension of the trough.

11. Vibrating table according to claim 6, wherein said connection means comprise flexible tabs which are associated at a longitudinal end of each feeder trough and end with a shaped sliding block which can be removably coupled in a shaped seat which is defined on said vibrating mass.

12. Vibrating table according to claim 11, comprising actuation means for the actuation of said flexible tabs, said means being constituted, for each one of said tabs, by a cylinder whose stem is connected, by virtue of the interposition of an articulation which eliminates transverse thrusts, to a presser element which acts on said shaped sliding block and can move from an engagement position, wherein it presses said shaped sliding block into the seat defined in said vibrating mass, to a disengagement position, wherein it keeps said sliding block disengaged from said seat with said tab secured by said presser element to stop the movement of the related feeder trough.

13. Vibrating table according to claim 1, wherein said return trough has, along its extension, a discharge passage which is arranged about a part recovery channel.

* * * * *